Feb. 23, 1971  A. C. GUYTON  3,565,529
ARTERIOVENOUS OXYGEN DIFFERENCE ANALYZER
Filed Sept. 26, 1967  2 Sheets-Sheet 1

INVENTOR.
Arthur Clifton Guyton

United States Patent Office 3,565,529
Patented Feb. 23, 1971

3,565,529
ARTERIOVENOUS OXYGEN DIFFERENCE ANALYZER
Arthur Clifton Guyton, 234 Meadow Road, Jackson, Miss. 39206
Filed Sept. 26, 1967, Ser. No. 670,610
Int. Cl. G01n 33/16; G01j 3/46
U.S. Cl. 356—41                                    2 Claims

ABSTRACT OF THE DISCLOSURE

The invention comprises a device for determining the difference between the oxygen content of arterial blood and venous blood. A photocell alternately measures light transmitted in a beam from a first light source through a venous blood sample and light transmitted in a beam from a second light source through an arterial blood sample. The intensities of the transmitted light beams are adjusted to achieve balance at the photocell, and the amount of adjustment is indicative of the oxygen difference.

---

This invention has for its primary purpose to provide an instrument for measuring continuously the difference between the amount of oxygen in the arterial blood of an animal or human being and the venous blood of the same animal or human being. Modifications of the system employed in this analyzer can also be used to measure the difference in optical density between any two solutions and can thereby be used to analyze concentrations of substances in solutions. In other words, the instrument is a new type of automatic and continuously recording photocolorimeter designed specifically for continuously recording the difference between arterial and venous oxygen concentrations in a live animal.

The analyzer has as a further object the measurement of the saturation of arterial blood with oxygen; that is, it can be used to determine the percentage of hemoglobin in the arterial blood that is combined with oxygen.

Still another object of the instrument is to provide a linear electrical output that is directly proportional to the difference in oxygen in the arterial and venous bloods. The electrical output can be used to actuate a meter which indicates arteriovenous oxygen difference directly, it can be used to actuate a recorder which records the arteriovenous oxygen difference continuously, or it can be fed into a computer and the electrical signal then used for computation of other functional aspects of animal body operation that are based on the arteriovenous oxygen difference, such as computing the output of the heart each minute, which is a standard procedure in many medical laboratories.

The difference between the amount of oxygen in the arterial and venous bloods is an important measurement in medical research and in basic animal physiological research. For instance, the difference between the amounts of oxygen in the venous blood entering the lungs and in the blood that is pumped out of the left heart into the arteries is a direct measure of the effectiveness of the lungs in assimilating oxygen into the blood. Likewise, the arteriovenous oxygen difference measured between an artery entering an organ and a vein leaving the organ gives a direct measure of the ability of the organ to remove oxygen from the flowing blood. The arteriovenous oxygen difference can be used to calculate oxygen uptake by the organ. It can also be used in conjunction with measurements of the amount of oxygen assimilated into the blood by the lungs to calculate the cardiac output, utilizing an important equation of physiological research called the Fick equation which states that cardiac output is equal to the oxygen assimilated into the blood by the lungs divided by the arteriovenous oxygen concentration difference between the blood flowing into the lungs and the blood leaving the lungs. Therefore, basic measurements of arteriovenous oxygen difference can be very important in assessing many aspects of function of the cardiovascular system.

Further and more specific objects will be apparent in the following specification. The invention is illustrated in the accompanying drawings showing one embodiment of the principle. The figures may be described as follows.

The basic principle of the arteriovenous oxygen difference analyzer may be described as follows.

Figure 1:
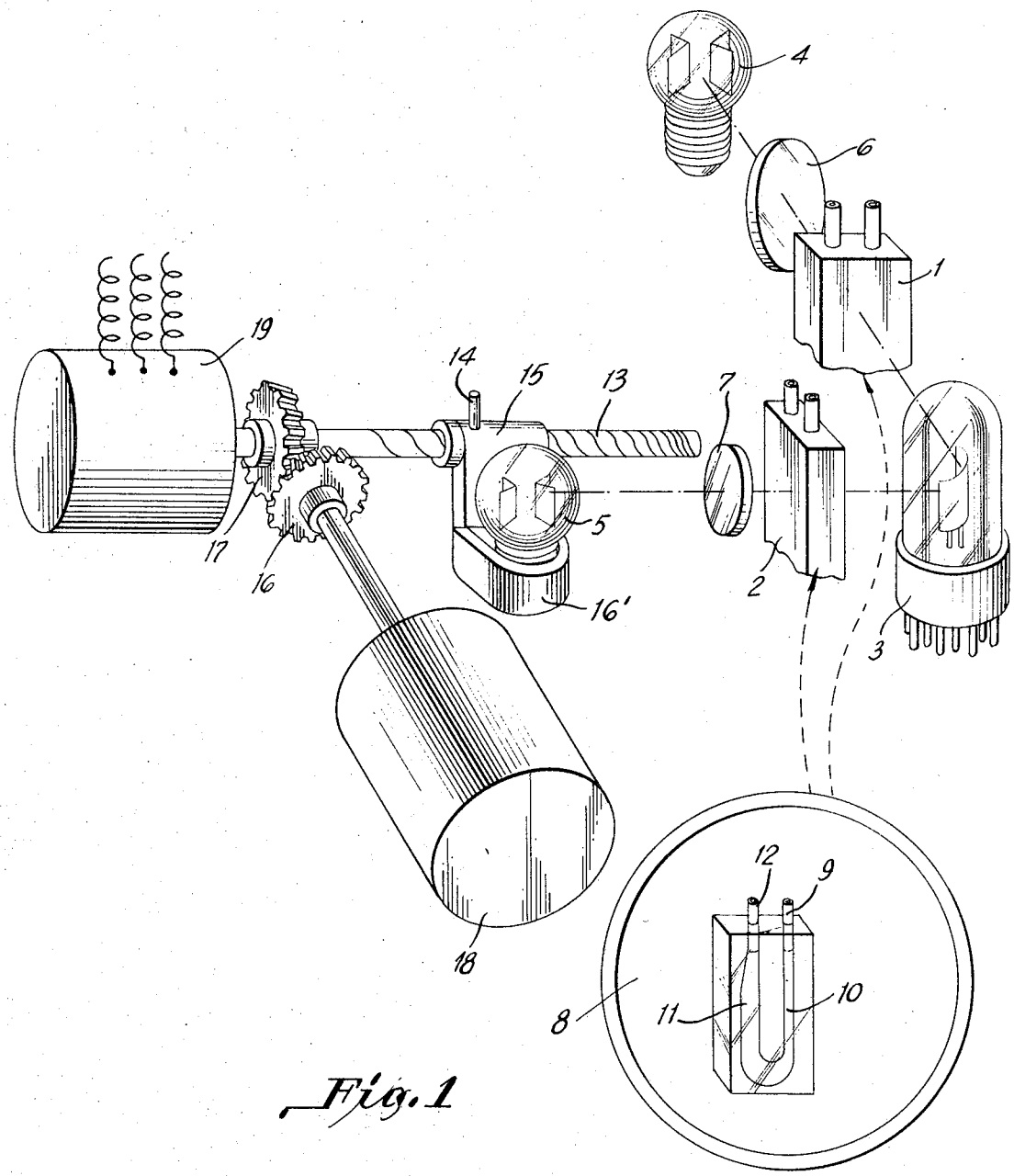
FIG. 1 illustrates an overall diagram of the basic principle of the arteriovenous oxygen difference analyzer.

In FIG. 1, it is noted that a venous cuvette 1 and an arterial cuvette 2 are each placed in separate light pathways that impinge on a single photomultiplier tube 3. Light is provided for the venous light pathway by neon glow tube 4 and for the arterial light pathway by neon tube 5. The electrical circuit is arranged in such a way that neon glow tube 4 glows during one-half cycle of the 60 cycle alternating current that activates the instrument, and neon glow tube 5 glows during the opposite half cycle of the 60 cycle current. Thus, the glows of the two glow tubes alternate with each other at a frequency of 60 per second. Furthermore, the lights from these two glow tubes are 180° out of phase with each other.

The lights from the two glow tubes pass through filters 6 and 7 which are red filters that pass red light above 630 millimicrons wave length and which block all light of wave lengths below 630 millimicrons. Thus, the lights that pass through both the venous and arterial cuvettes are dark red lights. It is in this spectral range that hemoglobin has a major change in optical density when it combines with oxygen, the optical density being approximately one-half as great for oxygenated hemoglobin as for deoxygenated hemoglobin. Since venous blood is characteristically deoxygenated and arterial blood is characteristically oxygenated, the optical density of the blood in the venous cuvette absorbs considerably more light than does the blood in the arterial cuvette. It is the goal of the instrument to measure the difference between these two optical densities and to convert the measurement into an electrical output that is a linear representation of the difference between the concentrations of oxygen in the arterial and venous bloods.

The inset 8 in FIG. 1 illustrates the basic structure of the two cuvettes. Blood enters through spout 9, passes down through conductive channel 10 and then enters the optical chamber 11. It is through this optical chamber that the light of the venous or arterial light pathway passes to impinge on the photomultiplier tube. After leaving the optical chamber, the blood passes out through spout 12. Blood is conducted to the cuvette through a thin tube called a catheter that is passed into an artery or vein of the animal or human being. Blood is made to flow through the cuvettes either by pumping the blood at some point along the tube or by utilizing the blood pressure of the animal to force blood through the cuvettes.

The mechanism for measuring the difference in optical density of the bloods in the arterial and venous cuvettes is based on the principle of moving the arterial light source closer or farther away from the arterial curvette, thereby achieving balance between the lights from the two light pathways as they impinge on the photomultiplier tube. Since the venous blood normally has a greater optical density than does the arterial blood, the arterial light source must normally be farther away from the arterial cuvette than must the venous light source to achieve the balance.

FIG. 1 illustrates the mechanism used to move the arterial light source closer or farther away from the arterial cuvette. A screw 13 engages a pin 14 that protrudes through sleeve 15 the end of which rests in the groove of the screw. The neon glow tube 5 that is the light source is held in light holder 16' which is connected to sleeve 15. Therefore, when screw 13 turns, the engagement of pin 14 in the screw groove causes the entire arterial light 5 and holder 16 to move either closer to the arterial cuvette or farther away from it.

It will be noted that the groove of screw 13 is not uniform in its pitch around the shaft of the screw. Instead, the groove becomes farther and farther apart the farther it is away from the arterial cuvette. The pitch of this screw at different distances along its axis has been calculated to provide a "corrected anti-logarithmic" movement of the light source 5 in relation to the number of turns made by screw 13. The reason for this is the following: it is desired to have a linear electrical output from the instrument in proportion to the oxygen concentration difference between the arterial and venous bloods. The two cuvettes 1 and 2 are made with precision so that their dimensions are exactly the same. Furthermore, all aspects of the arterial and venous bloods are almost exactly identical except for the amount of oxygen present in the two bloods. Therefore, other factors not related to the oxygen difference between these bloods are neutralized so that they cause no optical density difference between the two bloods. Consequently, the only factor that causes an optical density difference between the two bloods is the concentrations of oxygen in the two bloods. Furthermore, it can be shown mathematically that the optical density difference between the two bloods, when using monochromatic light, is directly proportional to the oxygen concentration difference between the two bloods. Therefore, if the measuring mechanism for the instrument can give a linear output related to optical density difference the output of the instrument itself will be linear rather than non-linear.

Light intensity from a light source changes with the square of the distance from the light source to the object. On the other hand, the light transmittance through a cuvette is an antilogarithmic function of the optical density of the absorbing medium in the cuvette. Therefore, to achieve linearity in instrument readout, the light intensity at the arterial cuvette has been made to change antilogarithmically in relation to the number of turns made by screw 13. To do this, it can be shown mathematically that the taper of the screw must be antilogarithmic. That is, the grooves of the screw near the cuvette must be very close together, and they must move farther and farther apart the greater the distance away from a cuvette.

However, the mathematical calculations of the screw taper are predicated on the basis of a point source of light and also use of monochromatic light in the system. The actual source of light is a plate of a neon glow tube, which has an area much larger than that of a point source and which is not monochromatic. For these reasons, in actual practice the calculated antilogarithmic screw does not give an accurate change in light intensity at the surface of the arterial cuvette that is antilogarithmically related to the number of turns of screw 13. Therefore, the taper of the antilogarithmic screw must be corrected for accuracy. This has been achieved in the instrument by placing bloods of known optical density differences in the arterial and venous cuvettes and making appropriate measurements. After using many such samples of blood with many different values of optical density differences, the degree of error of the antilogarithmic screw at different points along its course is plotted graphically, and an appropriate new screw, with appropriate corrections embodied, is then fashioned. The net result is a changing light intensity at the arterial cuvette in proportion to the antilogarithm of the number of turns of screw 13.

The anilogarithmic screw 13 is driven through gears 16 and 17 by servo-motor 18. Attached directly to screw 13 is the shaft of a 10-turn potentiometer 19 which gives an electrical output through terminals 20.

The servo-motor 18 is controlled by electrical signals from photomultiplier tube 3. So long as the two alternating cycles of light from the arterial and venous light pathways are equal to each other, the servo-motor runs in neither direction. If, however, the intensity of the light from the arterial light pathway is greater than the intensity from the venous pathway, the servo-motor is made to run in such a direction that the arterial glow tube 5 will move farther away from the arterial cuvette. Conversely, if the intensity of light is greater through the venous pathway than through the arterial pathway, glow tube 5 will move closer to the arterial cuvette. Thus, a continuous balancing system allows continuous positioning of glow tube number 5 so that precisely balanced pulses of light through the arterial and venous cuvettes will impinge on the photomultiplier tube. The degree of rotation of screw 13 required to achieve balance is read off electrically from the electrical output of potentiometer 19.

Figure 2:
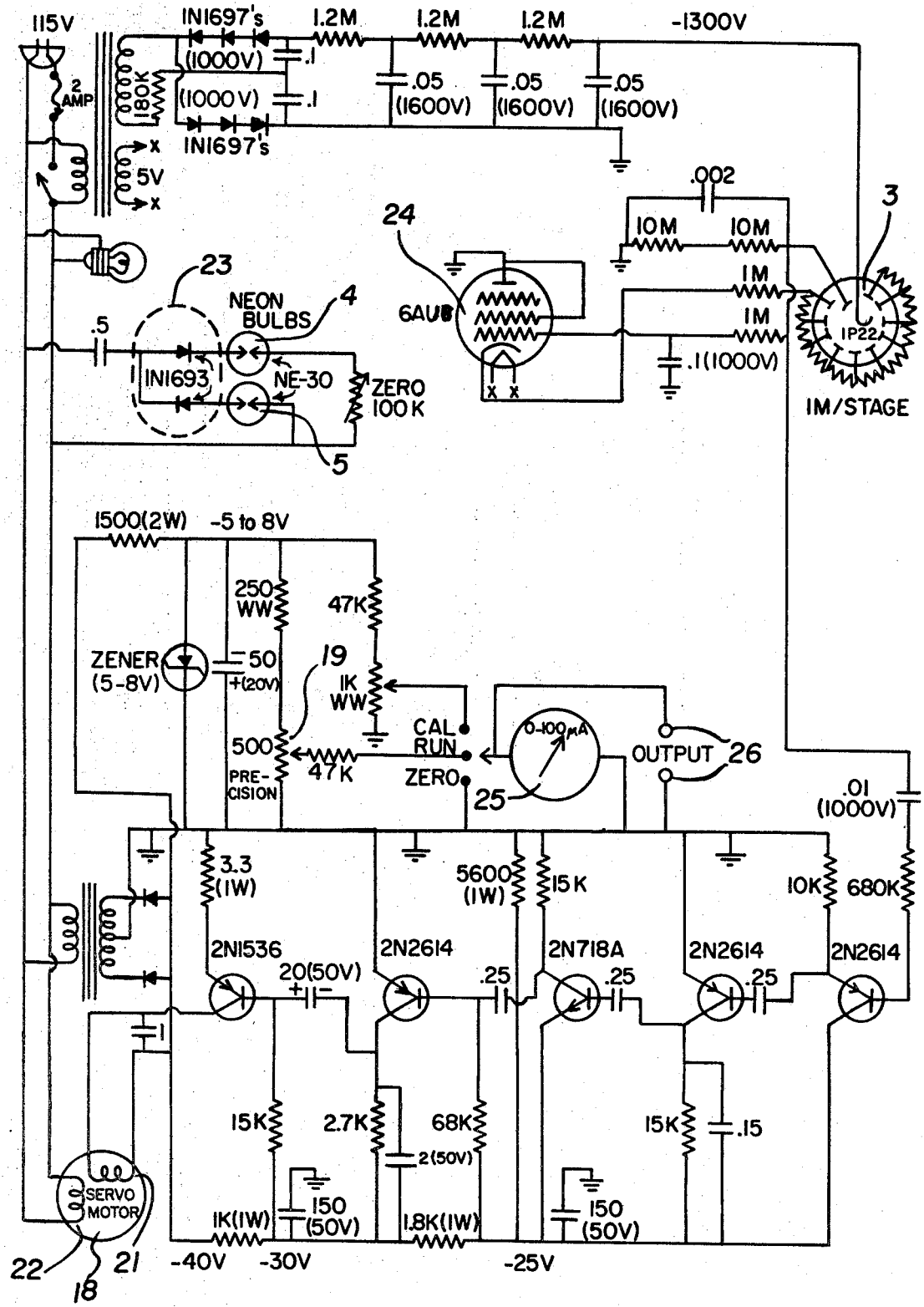
FIG. 2 illustrates the electrical diagram of the electronic control circuit for the analyzer.

The electronic circuit of FIG. 2 consists mainly of a servo-amplifier represented by the five transistors at the bottom of the circuit which control the servo-motor and which is activated by the photomultiplier tube. The principle of the servo-electronic system is the following: Since the neon glow tubes glow alternately with each other 60 times each second and are 180° out of phase with each other, they can be used to activate a two-phase servo-motor, making it run either forward or backward depending upon which of the two lights impinge most potently on the photomultiplier tube 3. This is achieved in the following way: Photomultiplier tube 3 detects the light pulses from the arterial and venous pathways. If these two pulses are precisely equal, then the photomultiplier tube puts out a signal at 120 pulses per second, all pulses of equal intensity. However, if the light from one of the pathways is more intense than from the other, the photomultiplier tube puts out 60 pulses that are strong and 60 pulses that are weak. The transistors of the servo-amplifier are biased near to cut-off so that the weak pulses are clipped out and only the strong 60 cycle pulses are allowed to pass from one transistor to the next. The output signal from the servo-amplifier is then impinged onto field 21 of servo-motor 18. Remember that the pulses impinging on this field can be controlled from either the arterial or the venous light pathway and that the respective pulses of these two pathways are 180° out of phase with each other. Electrical current is derived directly from the alternating current source to supply field 22 of the servo-motor. The 60 cycle current in this field leads the arterial light pulse by 90° and lags the venous light pulse by 90°. Therefore, if arterial pulses are the more powerful ones, the motor will run in one direction, while if the venous pulses are more powerful, the motor will run in the opposite direction. The gearing of the balance system is arranged so that whenever the arterial light is more powerful the arterial glow tube 5 will move away from the arterial cuvette, and when the venous light is more powerful the arterial glow tube 5 will move closer to the arterial cuvette. Thus, the electrical circuit provides for continuous balancing of the lights pasing through the two cuvettes.

The diodes 23 in the electrical circuit of FIG. 2 are used to alternate the glow of the two neon glow tubes 4 and 5.

Vacuum tube 24 provides a partial degree of automatic gain control for marked changes in optical densities of the arterial and venous bloods. Thus, if both of these bloods are very thin in hemoglobin, a greatly increased intensity of light through both of the cuvettes will be experienced, and too much output signal will come from photomultiplier tube 3. The voltage drop across the twenty megaohm plate load resistance of photomultiplier tube 3 causes a marked drop in the plate voltage of the photomultiplier tube. This in turn is impinged on the grid of vacuum tube 24 which operates as a cathode follower circuit so that the voltage supplied to the dynodes of photomultiplier tube 3 will decrease along with the decrease in plate voltage. This, in turn, greatly decreases the sensitivity of the photomultiplier tube.

Potentiomerer 19, which is connected directly to the antilogarithmic screw 13, is connected in an appropriate resistance network, supplied from a voltage source, to give an electrical output to meter 25 or to output terminals 26. The output recorded by meter 25 or output terminals 26 is linearly related to the number of turns made by screw 13, and this in turn is linearly related to the optical density difference between the bloods in the venous and arterial cuvettes. The optical density difference between these two bloods is linearly related to the oxygen concentration difference between the two bloods. Thus, the output at meter 25 or at output terminals 26 is linearly related to oxygen concentration difference between the bloods in the two cuvettes.

It should be noted that the use of the instrument is not limited to determination of oxygen concentration differences between arterial and venous bloods. For instance, a blank solution of any type can be placed in one of the cuvettes, and the optical density of the second cuvette minus that of the first can be determined. This gives a direct measure of the concentration of dissolved substance in the second cuvette. Therefore, the instrument can be utilized for continuous recording of concentrations of many different substances. Obviously, for each different type of substance that is to be measured, the appropriate filter would need to be used. Furthermore, the corrected antilogarithmic screw can be corrected for the specific spectral transmission curve of the substances to be measured.

This instrument can also be utilized to record percentage saturation of blood with oxygen. This is achieved by first oxygenating a sample of the blood to 100 percent oxygenation and deoxygenating another sample of the blood to 0 percent oxygen saturation. Then the total A-V oxygen difference between these two bloods is recorded. Thereafter, the 100 percent oxygenated blood is circulated continuously through the arterial cuvette and the unknown sample of blood is circulated through the venous cuvette. The instrument then measures the oxygen difference between the arterialized blood and the unknown blood. This is subtracted from a total A-V oxygen difference (that had been recorded during the calibration procedure) to give the oxygen content of the blood. Dividing the total A-V oxygen difference into the oxygen content of the blood at any given instant and multiplying this times 100 gives the percentage saturation of the arterial blood, which is a common measure in medical research of the effectiveness of oxygenation of blood.

One of the obvious changes that can be made in the instrument, and that will be equally satisfactory, is to use a single light source so that light passes through both cuvettes from the same source but utilizing two separate photosensitive devices to detect the lights through the respective cuvettes. One of these photosensitive devices is connected to the antilogarithmic screw in the same manner that one of the light sources is connected to the screw in FIG. 1. An appropriate electronic chopper circuit is used with the photosensitive device so that the outputs of the two photosensitive devices can be alternated for driving the servo-motor.

Still another change that would be equally satisfactory would be to utilize a separate light source and a separate photosensitive device for each of the two light pathways, the two lights and photosensitive devices being balanced against each other and their electrical outputs being used to control the movement of the servo-motor.

Finally, still another modification would be to leave the two lights and photosensitive device or devices stationary but to utilize an antilogarithmic device which drives a potentiometer that in turn controls the electrical current through one of the light sources in such a way that the light intensity changes in proportion to the antilogarithm of the number of degrees of turn of the driving servo-motor, while the servo-motor is connected linearly with the read-out device, whether this be electrical or mechanical.

It will be clear from the above description of the invention that many changes may be made which will not affect the basic principles of the invention.

The following features of the invention are claimed as new:

1. An apparatus for measuring the difference between the concentration of hemoglobin-bound oxygen in the arterial blood and the concentration of the hemoglobin-bound oxygen in the venous blood of an animal comprising in combination:

(a) an arterial blood cuvette and means to pass arterial blood continuously through the cuvette, this cuvette having an optical pathway for transmission of light through the arterial blood;

(b) a venous blood cuvette and means to pass venous blood continuously through the cuvette, this cuvette having an optical pathway for transmission of light through the venous blood, the pathway being of the same dimensions and optical characteristics as those of the arterial cuvette;

(c) a photosensitive device;

(d) two light sources, the light from one of which passes through said arterial cuvette and impinges on said photosensitive device and the light from the other of which passes through said venous cuvette and impinges on the same said photosensitive device;

(e) means to turn the two said light sources alternately on and off, one light source being on while the other is off, causing the output of said photosensitive device to increase and decrease as the lights pass alternately through the respective arterial and venous cuvettes and impinge on said photosensitive device;

(f) two optical filters positioned respectively between each said light source and each said respective cuvette, the filters passing only light having wavelengths above 630 millimicrons, at which wavelengths hemoglobin unbound with oxygen absorbs a proportionately greater amount of light than does hemoglobin bound with oxygen;

(g) a screw;

(h) a movable mounting for one of the two light sources, the mounting being movable along a track by said screw so that the light source moves nearer to or farther away from the respective cuvette as the screw turns, increasing or decreasing the intensity of light impinging on the cuvette;

(i) an electronic comparison means being fed by the output of said photosensitive device and the output of which is an alternating electric potential that is a function of the intensity difference between the two lights that alternately pass respectively through the arterial and venous cuvettes;

(j) a servo motor driven by the output from said electronic comparison means and connected to said screw, said servo motor turning said screw in an appropriate direction so that the intensity of the light impinging on the photosensitive device from the movable light source will be adjusted continuously to equal the intensity of the light impinging on the same photosensitive device from the second said light source;

(k) indicating means coupled to said screw for designating degree of rotation of said screw, thereby also designating distance of said movable light source from the respective cuvette, this distance being a measure of the light change required to compensate for the difference in absorption of light by the respective arterial and venous bloods in the two said cuvettes;

(1) said screw having a progressively variable pitch that drives said movable light source, and the pitch increasing from the end nearest the cuvette toward the opposite end approximately in proportion to the antilogarithm of the degrees of the degrees of rotation of the screw, the exact pitch at each point along the screw being slightly different from the antilogarithmic function, this difference being adjusted to compensate for the geometry of the light source, geometry of the cuvette, and optical characteristics of the light pathway so that the degrees rotation of the screw changes linearly with changes in absolute concentration difference between the hemoglobin-bound oxygen in the blood of said arterial cuvette and the hemoglobin-bound oxygen in the blood of said venous cuvette.

2. An apparatus for measuring the difference between the concentration of hemoglobin-bound oxygen in the arterial blood and the concentration of hemoglobin-bound oxygen in the venous blood of an animal as set forth in claim 1 further comprising;

(a) an alternating current power source for providing power to said two light sources, one light being on during one phase of the power source current and off during the opposite phase, while the second light is on when the first is off and off when the first is on;

(b) said servo motor having two windings and operating as a two phase motor so that it runs in one direction when current flow in the first winding leads current flow in the second winding by 90 degrees and runs in the opposite direction when current flow in the first winding lags current flow in the second winding by 90 degrees;

(c) means to pass alternating current from said power source through the first winding of said two phase servo motor so that the phase of current flow leads by 90 degrees the phase of excitation of the light source transmitting light through said arterial cuvette and lags by 90 degrees the phase of excitation of said light source transmitting light through said venous cuvette;

(d) a servo amplifier fed by the output of said photosensitive device, the output of which passes current through the second said winding of said servo motor so that when the light passing through the arterial cuvette is more intense than that through the venous cuvette, the maximum peak of current flow in the first winding of said servo motor leads the maximum peak of current flow in the second winding by 90 degrees, causing the motor to run in one direction and so that when the light passing through the venous cuvette is more intense than that through the arterial cuvette, opposite effects occur, causing the motor to run in the opposite direction;

(e) the said servo motor driving said screw so that the movable light source moves in the appropriate direction to approach balance between the intensities of the respective lights impinging on said photosensitive device after passing respectively through the said arterial and venous cuvettes.

References Cited

UNITED STATES PATENTS

| | | | |
|---|---|---|---|
| 1,437,809 | 12/1922 | Jones | 356—232 |
| 1,780,231 | 11/1930 | Hardy | 356—232X |
| 2,042,281 | 5/1936 | Traver | 356—206 |
| 2,547,212 | 4/1951 | Jamison et al. | 356—181X |
| 2,586,746 | 2/1952 | Tyler | 356—205X |
| 2,594,514 | 4/1952 | Sweet | 356—205 |
| 2,659,368 | 11/1953 | Gibbon, Jr., et al. | 356—41X |
| 2,976,761 | 3/1961 | Whitehead et al. | 356—181X |
| 3,177,757 | 4/1965 | Polanyi | 356—41 |
| 3,211,050 | 10/1965 | Pelavin | 356—39X |
| 3,270,348 | 8/1966 | Lesage et al. | 356—205X |
| 3,292,484 | 12/1966 | Clay | 356—205 |
| 3,329,821 | 7/1967 | Lesage | 356—206X |
| 3,392,623 | 7/1968 | Walker et al. | 356—205 |

RONALD A. WIBERT, Primary Examiner

W. A. SKLAR, Assistant Examiner

U.S. Cl. X.R.

250—218; 356—179, 183, 185, 193, 208